June 2, 1925.  
W. GAARZ  
1,539,834  
SAFETY SYSTEM FOR ALTERNATING CURRENT GENERATORS  
Filed Feb. 3, 1925
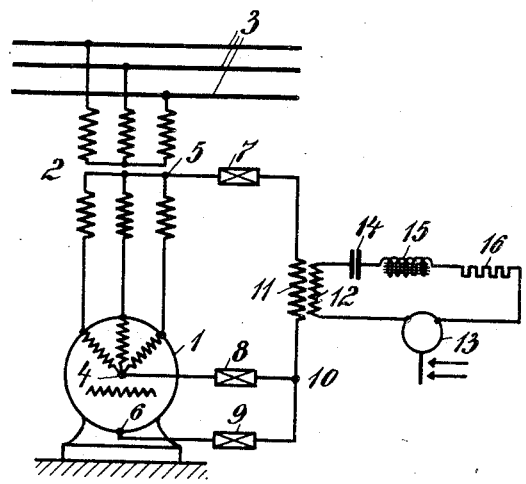
INVENTOR  
*Wilhelm Gaarz*  
BY  
ATTORNEY Patented June 2, 1925.

1,539,834

UNITED STATES PATENT OFFICE.

WILHELM GAARZ, OF BERLIN-CHARLOTTENBURG, GERMANY, ASSIGNOR TO WESTINGHOUSE ELECTRIC & MANUFACTURING COMPANY, OF NEW YORK, N. Y., A CORPORATION.

SAFETY SYSTEM FOR ALTERNATING-CURRENT GENERATORS.

Application filed February 3, 1925. Serial No. 6,602.

*To all whom it may concern:*

Be it known that I, WILHELM GAARZ, a citizen of the German Empire, residing at Berlin-Charlottenburg, Germany, have invented certain new and useful Improvements in Safety Systems for Alternating-Current Generators, of which the following is a specification.

My invention relates to improvements in protective systems for alternating current generators.

A protective system for alternating current generators is already known in which the neutral point of the generator is connected across a directly or indirectly connected relay with the primary neutral point of a bank of transformers connected with the generator or with the neutral point of star-connected choking coils at the bus-bars and also with the grounded shell of the generator. This protective system is not satisfactory in so far as the relay, if very sensitive, is liable to respond even when the generator is sound, owing to the fact that the sum of the third harmonics of the voltage waves generate currents in the conductor between the neutral points of the generator and the bank of transformers or the choking coils. In order to prevent the response of the relay owing to these equalizing currents it is necessary to keep the sensitiveness of the relay within certain limits.

According to my invention the operation of the relay by the third harmonics is avoided by employing a relay which can only respond to currents the frequency of which lies within the sphere of the frequency of the network. In this manner it is possible to employ a sensitive relay in the known protective system of connection described in the introduction.

The drawing affixed to this specification and forming part thereof shows an example of a protective system according to my invention.

Referring to the diagram of connections shown it will be seen that the three-phase alternating current generator 1 is connected to the bus bars 3 through a transformer 2. The neutral point 4 of the winding of the generator 1, the primary neutral point of the transformer 2 and the grounded shell of the generator with the connecting point 6 are connected with a common point 10 across the resistances 7, 8 and 9 respectively. Between the point 10 and the neutral point of the transformer 5 is located the primary coil 11 of a voltage transformer, the secondary coil 12 of which operates a relay 13. In order that according to my invention the relay should only respond to a limited frequency range around the normal frequency of the network, for instance at the standard frequency of 50 at frequencies of about 40 to 60, the circuit of the voltage relay 13 is in the illustrated example shown as a resonance circuit. For this purpose a condenser 14 and a choking coil 15 are connected in this circuit. In order that the sensitiveness of the relay should not fluctuate too much with the frequency but should remain fairly constant within a certain range sufficient damping has been provided. The ohmic resistance required for this purpose is indicated at 16. As a matter of course this resistance might be contained in the resistances of the other appliances in this circuit. It will be understood that instead of the illustrated tuning of the relay to the network frequency other known systems might be employed for the same purpose.

What I claim as my invention is:—

1. In a protective system for alternating-current generators having star-connected windings, a relay connected to the neutral point of the generator adapted to respond only to currents the frequency of which lies in the neighborhood of the frequency of the generator.

2. In a protective system for alternating-current generators, a relay so connected to the generator as to be energized upon the occurrence of a fault therein, said relay being connected in a resonance circuit tuned to the frequency of the generator.

3. In a protective system for alternating-current generators, the combination of a relay so connected to the generator as to be energized upon the occurrence of a fault therein, a resonance circuit for said relay tuned to the frequency of the generator and an ohmic resistance in said resonance circuit adapted to damp said circuit.

4. In an alternating-current distribution system having a grounded neutral, a relay so connected to said system as to be responsive to ground current flowing in said neutral, said relay comprising contact members and resonant means tuned to the normal frequency of the system for actuating said contact members.

In testimony whereof I affix my signature.

WILHELM GAARZ.